(12) United States Patent
Rydbeck

(10) Patent No.: US 6,947,770 B2
(45) Date of Patent: Sep. 20, 2005

(54) CONVENIENT DIALING OF NAMES AND NUMBERS FROM A PHONE WITHOUT ALPHA KEYPAD

(75) Inventor: Nils R. Rydbeck, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 833 days.

(21) Appl. No.: 09/888,036

(22) Filed: Jun. 22, 2001

(65) Prior Publication Data

US 2002/0198027 A1 Dec. 26, 2002

(51) Int. Cl.⁷ .............................................. H04B 1/38
(52) U.S. Cl. ................................................... 455/564
(58) Field of Search .................. 379/216.01, 218.01, 379/352, 354, 355.01, 355.02, 355.05, 455.09; 455/564

(56) References Cited

U.S. PATENT DOCUMENTS

| | | | | |
|---|---|---|---|---|
| 5,303,288 A | * | 4/1994 | Duffy et al. ................ | 455/564 |
| 5,337,347 A | | 8/1994 | Halstead-Nussloch et al. | |
| 5,953,541 A | | 9/1999 | King et al. | |
| 6,061,437 A | | 5/2000 | Yoon | |
| 6,222,917 B1 | * | 4/2001 | Gates ..................... | 379/218.01 |
| 6,430,405 B1 | * | 8/2002 | Jambhekar et al. ......... | 455/403 |
| 6,442,270 B1 | * | 8/2002 | Simon et al. .......... | 379/355.09 |

FOREIGN PATENT DOCUMENTS

GB    2335059 A    3/1999

OTHER PUBLICATIONS

Derwent printout corresponding to JP–0152540, Filed Jun. 13, 1996, pp. 1–2.

* cited by examiner

*Primary Examiner*—Bing Q. Bui
(74) *Attorney, Agent, or Firm*—Moore & Van Allen PLLC; Gregory A. Stephens

(57) ABSTRACT

Retrieving a desired telephone number from a database in a mobile communication unit is facilitated by utilizing the frequency with which the user calls each telephone number stored in the database in a manner that allows the mobile communication unit to make a "best guess" of which phone number the user is seeking each time the user pushes a key while inputting a name or character string representing the person that the user wishes to call from the mobile communication unit. If the database does not include any name or character string potentially matching a desired character string entered via a keypad, the mobile communication unit automatically switches to normal phone number entry mode.

29 Claims, 5 Drawing Sheets

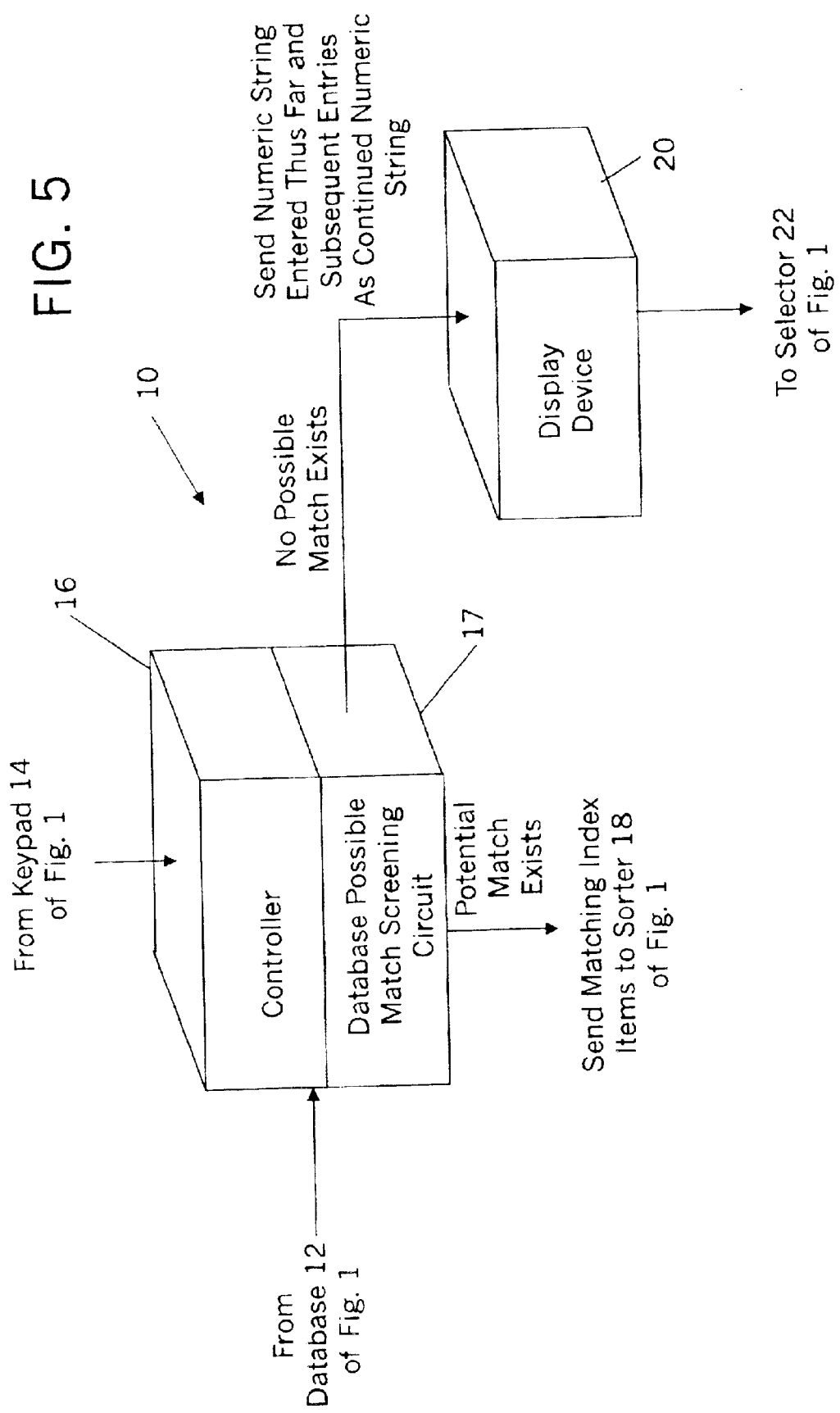

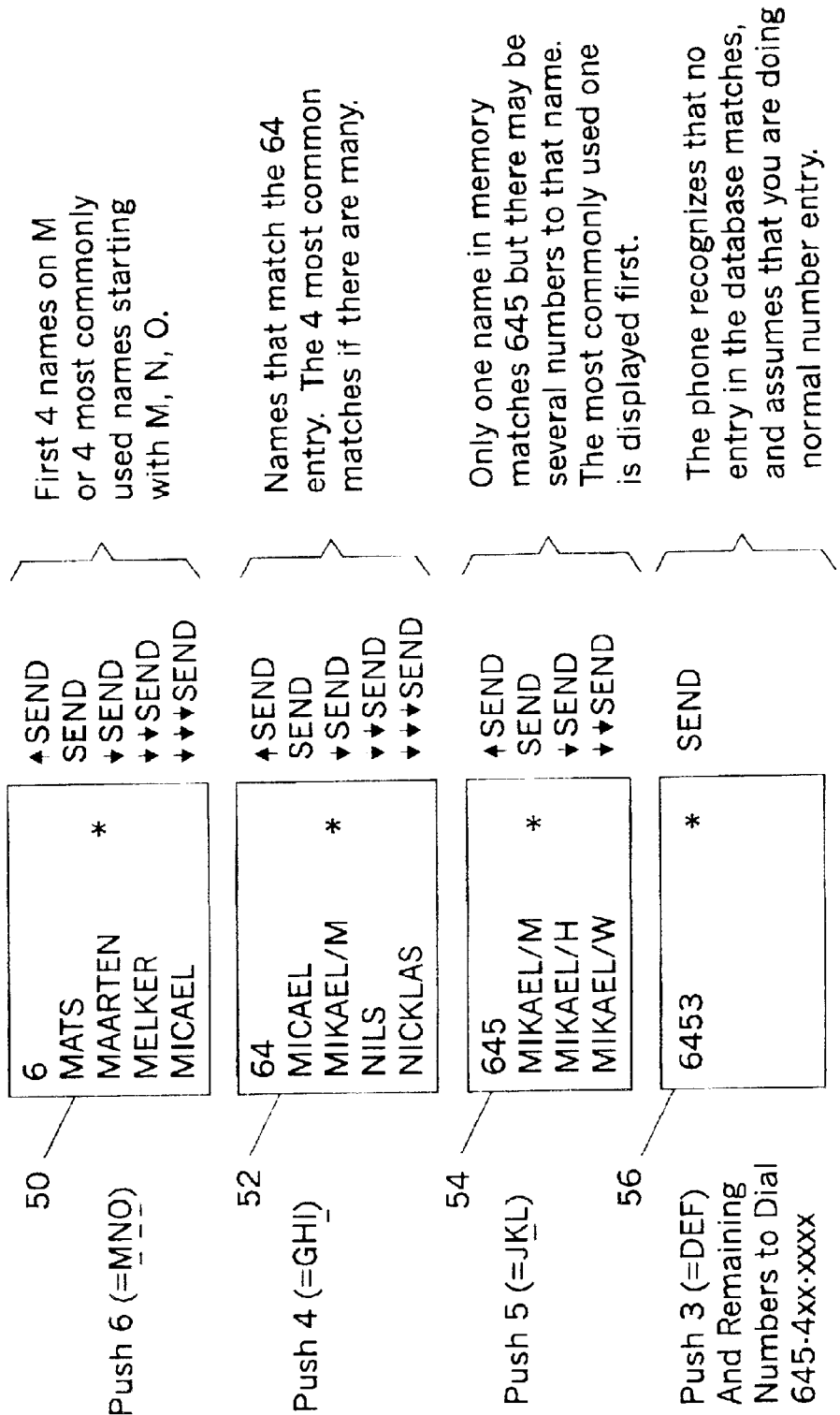

CONVENIENT DIALING OF NAMES AND NUMBERS FROM A PHONE WITHOUT ALPHA KEYPAD

BACKGROUND OF THE INVENTION

This invention relates to a mobile communication unit and, more particularly, to an apparatus and method for conveniently placing a call to a telephone number which is not found among a list of frequently called telephone numbers stored in a database within the mobile communication unit.

Mobile communication units, such as cellular telephones, often have features allowing a user to store the names and telephone numbers of parties frequently called by the user in a phonebook-type database within the mobile communication unit. Such a database typically includes a number of data records, each containing the name and telephone number of a party frequently called by the user and a unique searchable index item in a form representing an alpha character string. The name of the party is often used as the index item.

To retrieve a phone number from such a database, the user presses the keys on the telephone keyboard to indicate a desired character string. Circuitry and software within the mobile communication unit compare the desired character string, starting with the first character entered and proceeding to the last character entered, with the same position characters of index items in the data records stored in the database. Data records having index items matching the desired character string are selected from the database within the mobile communication unit and, typically, a grouping of names, telephone numbers, or another portion of the data records containing at least a partial match with the desired character string are displayed on a display device of the mobile communication unit. The mobile communication unit also typically includes a scrolling and selecting device for scrolling through the displayed portions of the data records and selecting a name or telephone number that the user desires to call.

If mobile communication units were equipped with full alpha-numeric keyboards of the type found on a typewriter or a personal computer, the process described above could be accomplished in a relatively straightforward manner. Mobile communications units are generally far too small, however, to include a full alpha-numeric keyboard. More typically, the mobile communication unit will have a standard telephone keypad wherein each of the keys from 2–6 and the 8 key also represent three alpha characters, and the 7 and 9 keys also represent four alpha characters each. Because each of the keys can potentially represent a number and three or four alpha characters, the keystrokes representing the desired character string can represent a large number of potential alpha-numeric combinations. The circuitry and software within the mobile communication unit must, therefore, have the ability to resolve the ambiguity created by the large number of potential combinations represented by the keystrokes of the desired character string.

In the past, statistical analysis, and sequential matching, keystroke by keystroke, of the desired character string with index items in the database potentially matching the character string have been utilized for performing a search of the database and resolving the ambiguity of the input. Because it is typically much easier for a user to remember the name of a party he desires to call, rather than the phone number of that party, these prior systems generally assume that the character string is an alpha representation of an index item such as the name of the party. Examples of circuitry and software of this type are provided by U.S. Pat. No. 5,953,541 to King et al; U.S. Pat. No. 5,337,347 to Halstead-Nussloch; U.K. Patent Appln. No. 9804831.7 to Gang Hu, and Chang; and U.S. Pat. No. 6,061,437 to Yoon.

A common problem with all prior techniques, however, is that when they recognize that there is no entry in their database that could possibly match the desired character string, the search routine abruptly terminates, at best, with a message notifying the user to switch the phone to a normal dial-by-phone-number mode. Switching the phone to a normal dial-by telephone number mode typically involves pressing additional function keys to switch modes. The character string inputted up to the time the search routine was terminated is lost and must be re-entered after the mode of operation is switched.

Further improvement is needed to make such systems truly user-friendly for users of mobile communication units.

SUMMARY OF THE INVENTION

My invention provides an apparatus and method for facilitating retrieval of a desired telephone number from a database in a mobile communication unit by utilizing the frequency with which the user calls each telephone number stored in the database in a manner that allows the mobile communication unit to make a "best guess" of which phone number the user is seeking each time the user pushes a key while inputting a name or character string representing the person that the user wishes to call from the mobile communication unit. If the database does not include any name or character string potentially matching a desired character string entered via a keypad, the mobile communication unit automatically switches to normal phone number entry mode.

In one form of my invention, the mobile communication unit retains the desired character string entered by the user prior to switching from alpha mode to normal numerical number entry mode as a first portion of a telephone number, when the mobile communication unit automatically switches from alpha mode to normal numerical number entry mode. In another form, my mobile communication unit recognizes any characters added to the desired character string after switching to normal telephone number entry mode as additional numerical characters appended to the desired character string.

In another form of my invention, the data base includes data records containing a frequency with which each of the telephone numbers in the data base is called by the mobile communication unit. As the desired character string is entered, names of persons having phone numbers in the data base which partially match the desired character string inputted to that point are displayed in a list ordered first by the frequency that the telephone number for that data record is called by the mobile communication unit, and ordered second alphabetically for telephone numbers called with equal frequency by the mobile communication unit. The mobile communication unit continues to display names partially matching the desired character string as additional characters are added, until such time that the mobile communication unit determines that the data base does not contain any character strings potentially matching the desired character string. With this arrangement, the user can utilize the mobile communication unit in either an alpha search mode matching a desired character string to a name in the data base, or in a normal phone number entry mode without pressing additional buttons to switch the mode of operation of the mobile communication unit, considerably facilitating the process of placing a call in either mode of operation in comparison to prior methods and devices.

In still another form of my invention, the desired character string entered by the user may be selected by the user, and the user may further select between calling the desired character string and calling a speed dial number associated with the desired character string. In yet another form, one of the data records having the desired character string may be selected and a call attempted to the telephone number associated with the data record, with a different one of the data records having the desired character string (such as the most frequently called of those different data records) automatically selected if the call is unsuccessful.

Other aspects, embodiments, and advantages of my invention will be apparent upon consideration of the following detailed description and attached drawing figures.

BRIEF DESCRIPTION OF THE DRAWINGS

FIG. 5 depicts an apparatus for carrying out the method depicted in FIG. 4; and

FIG. 6 depicts a detailed example of certain aspects of my invention.

DETAILED DESCRIPTION OF THE INVENTION

Figure 1:
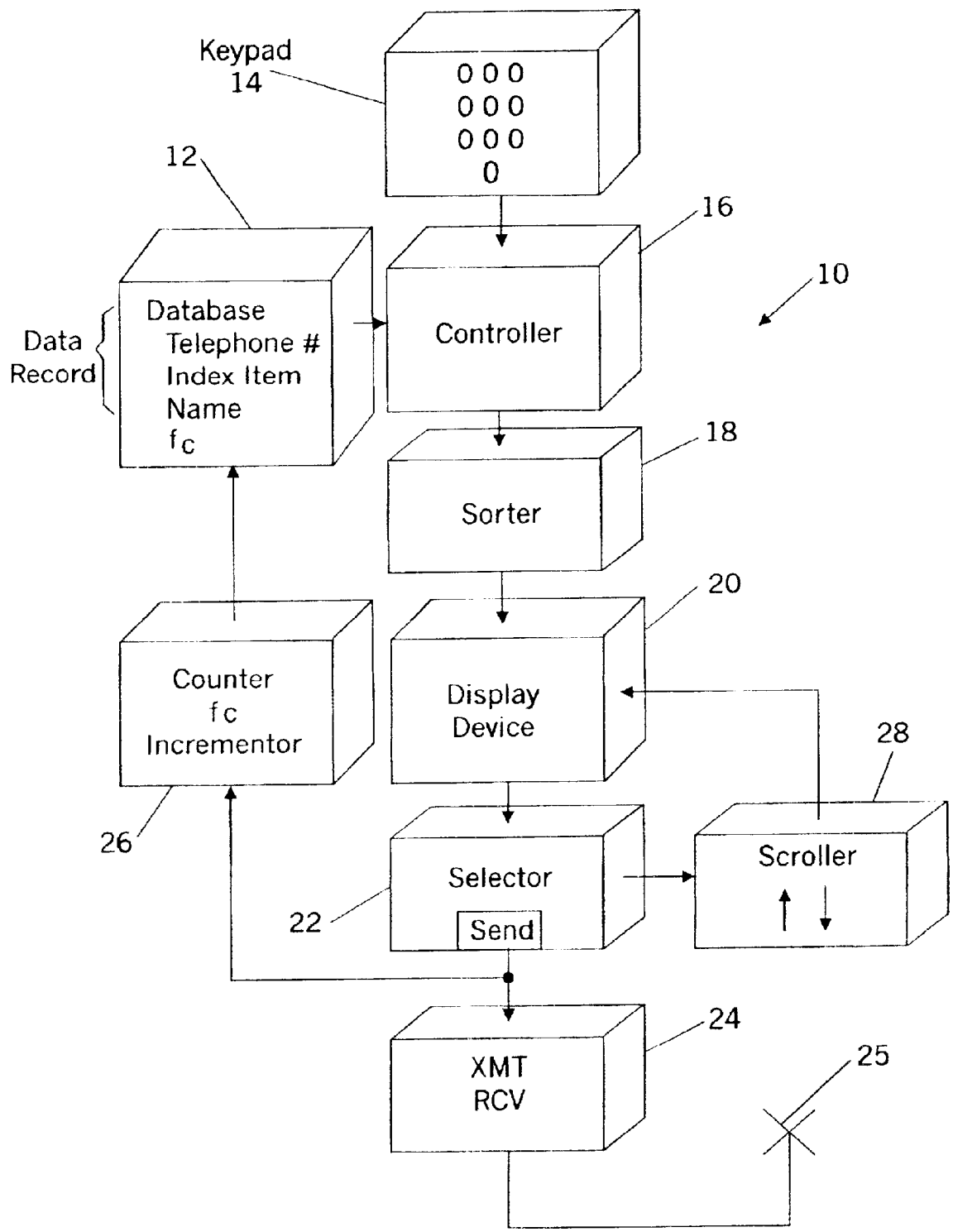
FIG. 1 depicts a mobile communication unit according to my invention.

FIG. 1 depicts an exemplary embodiment of a mobile communication unit 10 according to my invention. The mobile communication unit 10 includes a database 12 for storage of data records for one or more telephone numbers, with each data record containing a stored character string representing a name of a party corresponding to each phone number stored in the database. Each data record also includes a "frequency called value" $f_c$ representing a frequency with which the mobile communication unit 10 places a call to each of the telephone numbers stored in the database 12.

A keypad 14 is provided for inputting a desired character string representing a portion of a name of a party to be called. Key pad 14 may be a standard telephone keypad having three or four alpha characters assigned to each of the number keys 2–9. Other keypad arrangements for inputting alpha-numeric character strings may also be used.

A controller 16 receives the desired character string from the keypad 14 and searches the data records for stored character strings beginning with a portion of the desired character string. The controller 16 provides a listing of names, together with phone numbers and $f_c$ values for each stored character string identified in the controller's search of the database to a sorter 18. The sorter 18 sorts the listing of names together with phone numbers and $f_c$ values, and provides an ordered listing sorted first by frequency called ($f_c$) and second by alphabetical order for numbers having identical frequencies called ($f_c$) to a display device 20.

The display device 20 may be provided in any one of a number of forms, such as CRT screens, liquid crystal displays and LED. The display device 20 could also include an audio output of a type produced by a computer speech generation chip. The display device 20 displays a first grouping of names in the ordered listing received from the sorter 18.

A selector 22 is provided for selecting a name of a party to be called by the mobile communication unit, from the names displayed in the first grouping on the display device 20. If the first grouping includes the name of the party the user wishes to call, the selector 22 is utilized by the user to highlight and select that name in the first group, by depressing a send button or other type of commonly used indicating device in the selector. The selector 22 provides the telephone number in the data record for the selected name in the first grouping to a receiver/transmitter 24, which in turn sends a signal via an antenna 25 requesting communication be established between the mobile communication unit 10 and the telephone number selected by the user.

The mobile communication unit 10 also includes a counter incrementor 26 configured to receive a signal from the selector 22 each time the user places a call to a phone number in the database. The counter incrementor 26 and database 12 are configured such that upon receipt of a signal from the selector, the counter incrementor 26 increments the frequency called value ($f_c$) in the data record for the telephone number called in the database 12.

The mobile communication unit 10 further includes a scroller 28 for use in conjunction with the selector 22 and display device 20 when the ordered listing of names provided to the display device 20 by the sorter 18 is longer than a maximum number of listings that can be displayed simultaneously on the display device 20. When this occurs, the user utilizes the scroller 28, by actuating up and down arrows, for instance, for scrolling through the entire ordered listing provided by the sorter 18 in search of the telephone number that the user wishes to call.

Figure 2:
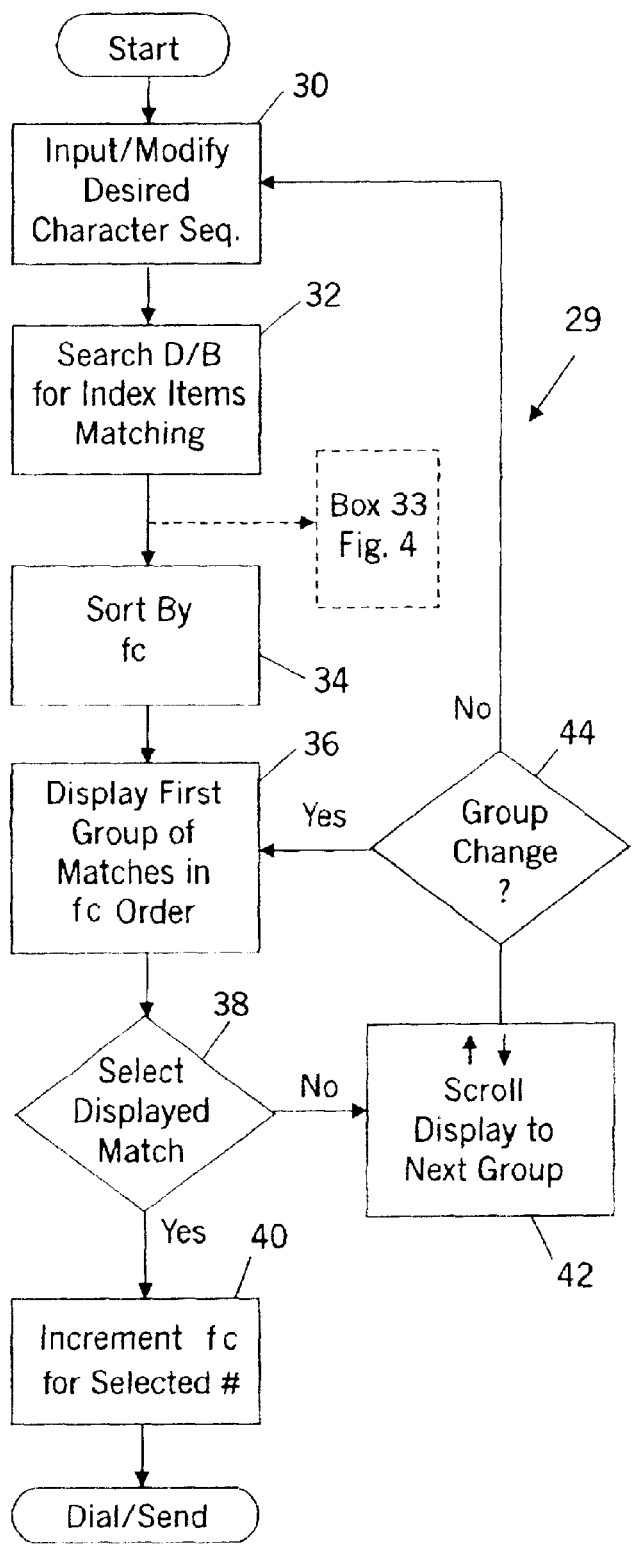
FIG. 2 is a flow chart depicting an exemplary embodiment of a method according to my invention.

FIG. 2 depicts a method according to my invention for using a mobile communication unit, such as the embodiment of a mobile communication unit 10 described above. As indicated at box 30, the user inputs a desired character sequence representing a name or number of a party to which the user wishes to place a call using the keys of the keypad 14. The controller 16 then searches the data records for the telephone numbers in the database 12 for index items matching the desired character sequence, as shown at box 32 in FIG. 2. The sorter 18 then sorts the matching index items identified in box 32 and generates an ordered listing of the data records found in box 32, with the matching items sorted in order of the frequency called value ($f_c$) as shown at box 34 of FIG. 2. A scrollable list of a portion of the data records including index items found in box 32 is then displayed on the display device 20 as indicated by box 36 of FIG. 2. The user then examines the records displayed on the display device 20, as illustrated by decision box 38 of FIG. 2, and if the number he wishes to call is displayed, the user selects that number using the selector 22. When the user selects a number to be called, a signal is sent by the selector 22 to the receiver/transmitter 24 to initiate the call, and the counter incrementor 26 is triggered as shown at box 40 to increment the $f_c$ value in the data record for the telephone number selected by the user.

If the number that the user wishes to call from the database entries is not found in the grouping of names currently being displayed by the display device 20 when the user performs the step indicated by decision box 38, the user will scroll the display to another grouping utilizing the scroller 28, as indicated at box 42. In the event that the display cannot be scrolled to a new group because all of the data items matching the desired character string, as inputted to this point, are already displayed, or because the top or bottom of the ordered listing has been reached during previous attempts to scroll the display, as indicated by decision box 44, the user would be returned to step 30 and given the option of modifying the current desired character string, or inputting another desired character sequence using the keys of the keypad 14. Boxes 30–38 and 42–44 are then repeated until the name of a party in the database to whom the user wishes to place a call is displayed in a group of data records on the display device 20 and the user selects a number from the data records displayed and initiates placement of a call.

Figure 3:
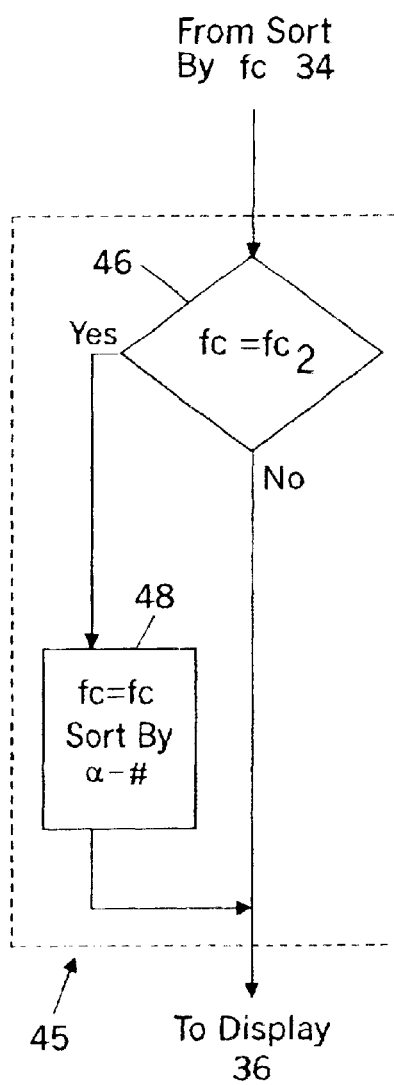
FIG. 3 is a flow chart depicting an alternate embodiment of a sorting operation according to my invention which may be combined with the method depicted in the flow chart of FIG. 2.

FIG. 3 depicts an alternate method according to my invention for including a step of further sorting (box 45) data records identified in the searching (box 32) having index items matching the desired character sequence input at step 30 and identical $f_c$ values. In the alternate embodiment depicted in FIG. 3, the $f_c$ values for data records including index items identified during the search 32 as having character sequences at least partially matching the desired sequence are first compared, as illustrated at decision box 44 of FIG. 3, to identify any data records having identical $f_c$ values. Identical $f_c$ values can occur at any time during the operation of the mobile communication unit, as the $f_c$ values are continually incremented each time a call is placed, or the first time that the (boxes 30–36) of inputting a desired character sequence and displaying a group of data records having index items matching the desired character string is carried out, i.e., prior to placing a call to any of the telephone numbers in the database such that $f_c=0$ for all data records in the database. If no instances of $f_c=f_c$ are identified upon performing step 44, the sorter 18 provides an ordered list sorted entirely according to the $f_c$ values to be displayed 36 on the display device 20. If there are any instances of $f_c=f_c$ identified in performing the comparison step 44, the data records having the identical $f_c$ values are further sorted and displayed in alphabetical or, alternatively, in numerical order as shown by step 46 of FIG. 3. The modified ordered list created by the resorting step is then passed to the display device 20 for display (box 36) of a first grouping of data records as described above.

Figure 4:
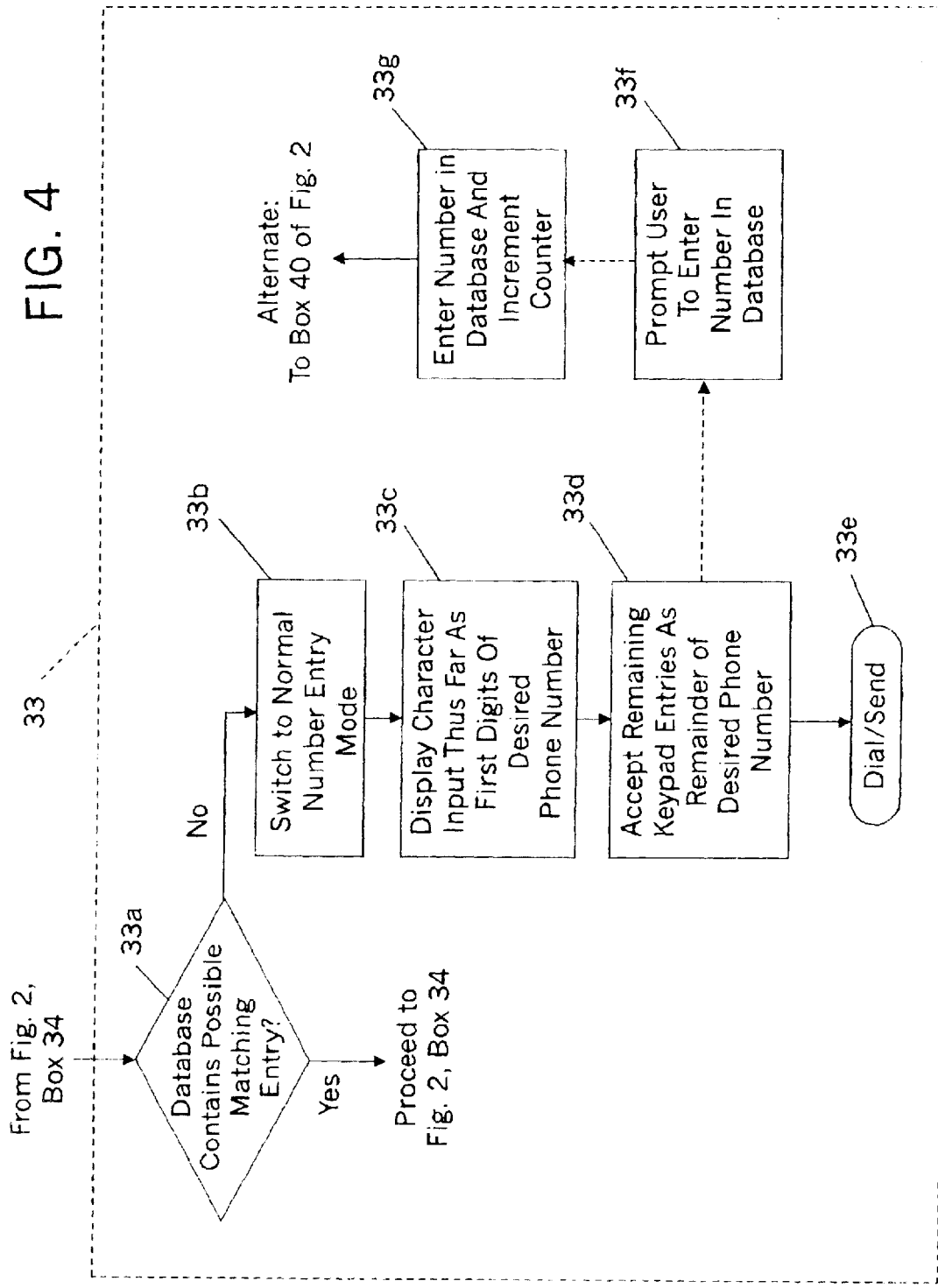
FIG. 4 is a flow chart depicting a method in which a mobile communication unit automatically switches from a directory look-up mode to a normal number entry mode when the mobile communication unit determines that there are no entries in its internal database potentially matching a character string inputted by the user.

FIGS. 4 and 5 further depict the mobile communication unit 10 and method 29 shown in FIGS. 1–3, in which the mobile communication unit 10 automatically reverts to normal phone number entry mode when no entry in the database could potentially match the desired character string. As shown in FIG. 5, this embodiment of my mobile communication unit 10 includes a screening circuit 17 for determining whether the database contains any data entries potentially matching the desired character string. If the screening circuit 17 determines that potential matches exist, data entry including index items potentially matching the desired character string are sent on to the sorter 18 of FIG. 1, and utilized as described above in relation to FIGS. 1–3. If the screening circuit 17 determines that the database contains no entries potentially matching the desired character string, the controller 16 is configured to automatically switch from a database search mode to a normal phone number entry mode. The controller will send only the numeric character string entered thus far to the display device and assume that subsequent entries are continued numeric character entries from the user keying in the remaining digits of the phone number he desires to call.

FIG. 4 illustrates a method of operating the mobile communication unit described above with regard to FIG. 5, including the process of box 33 in FIG. 2 and FIG. 4. This method branches off between the search and sort steps depicted by boxes 32 and 34 in FIG. 2.

As shown in FIG. 4, the alternate method 33 includes screening the output of the search step 32, as indicated at diamond 33a in FIG. 4, to determine whether the database contains any data entries potentially matching the desired character string. If the database does contain data entries potentially matching the desired character string, the screening step indicated by diamond 33a provides a list of any index items potentially matching the desired character string to the sort step illustrated by box 34 of FIG. 2, and the method of searching the database continues as described previously in regard to FIGS. 2 and 3. If it is determined during the screening step 33a that the database does not contain any potential matches for the desired character string, the mobile communication unit switches to normal number entry mode as illustrated at box 33b of FIG. 4, and the desired character sequence inputted thus far is displayed as the first digits of a phone number that the user wishes to call, as illustrated at box 33c of FIG. 4. Once the mobile communication unit has reverted to normal phone number entry mode, as illustrated at boxes 33b,33c, the mobile communication unit 10 will assume that any subsequent keypad entries constitute the remaining digits of the phone number that the user wishes to call, and will accept and display those keypad entries as illustrated at box 33d. Once the user has completed entry of the desired phone number, he can dial the desired number by pressing the "SEND" key as indicated at box 33e of FIG. 4.

In some embodiments of my invention, after the mobile communication unit has automatically reverted to number entry mode, and the desired telephone number has been completely entered in box 33d, the user is prompted to enter the desired number in the database as illustrated at box 33f. The user may then elect to proceed with entering the number in the database and having the mobile communication unit automatically increment the frequency counter as shown at box 33g. Alternatively, the user may elect not to enter the number in the database and simply proceed with dialing the desired number by pressing the "SEND" key as shown at box 33e.

FIG. 6 depicts an example of how a mobile communication unit as described above would determine that a user was entering a phone number rather than performing a directory search, and automatically switch from the directory search mode to a normal number dialing mode. Specifically, the example of FIG. 6 illustrates how the mobile communication unit 10 would determine that the user was attempting to enter a phone number starting with the digits 645-XXX-XXXX, rather than seeking a phone number in a database entry for a person named MIKAEL, for which the keystroke entries on a normal telephone keypad would also be 6,4,5 to represent the first three letters M,I,K of MIKAEL's name.

In the example depicted in FIG. 6, the mobile communication unit 10 includes a database 12 containing data records for telephone numbers of six persons named: MATS, MAARTEN, MELKER, MIKAEL, NILS, and NICKLAS. The database further contains three separate entries for the person named MIKAEL designated MIKAEL/M, MIKAEL/

H, and MIKAEL/W, for MIKAEL's mobile, home and work telephones respectively. Each data record contains a stored character string representing the name of one of the six parties corresponding to each of the eight phone number stored in the database, and a frequency ($f_c$) with which the mobile communication unit has placed calls in the past to each of the eight phone numbers stored in the database. The keypad 14 is a standard telephone alpha-numeric keypad having three alpha characters associated with the number keys 2–6 and 8, and four alpha characters associated with number keys 7 and 9.

As indicated at box 50 of FIG. 6, with the mobile communication unit 10 initially operating in a directory look-up mode, when our user pushes the number 6 key on the keypad 14, the mobile communication unit will assume that the user is attempting to locate a telephone number from the database for a person whose name starts with M, N, or O. The controller 16 will search the database 12 for an index item/name matching the desired character sequence entered by the user, as shown at box 32 of FIG. 2. On the basis of the single keystroke entered to this point by the user, i.e., pressing the 6 key on the keypad, the controller 16 will retrieve the data records for all telephone number in the database having a name starting with the letter "M", "N", or "O", and supply a listing of the data records retrieved from the search 32 to the sorter 18. The sorter 18 will sort the list received from the controller 16 into an organized listing sorted in order of which of the phone numbers returned in the search has been called with the greatest frequency ($f_c$) in the past by the user. The organized listing provided by the sorter 18 (box 34) is then checked to determine whether any of the names in the organized list have been called with the same frequency $f_c$ by the user in the past (box 46). Where equal $f_c$ values are found, the names associated with those equal $f_c$ values will be organized in alphabetical order at the appropriate $f_c$ location in the organized list (box 48), and the resulting organized list will be provided to the display device 20.

In the example depicted by FIG. 6, the mobile communication unit 10 includes a display device 36 capable of displaying five lines of alpha-numeric characters. On the top line, the numbers of the keys pressed by the user to represent the desired character sequence, i.e., the name or number to be called, are displayed in the order in which the keys are pressed, starting from the left and moving to the right. The desired character sequence line is followed by four lines of alpha character sequences representing the first four names in the organized listing provided by the sorter 18. The display device 36 includes an indicator, in the form of an asterisk in boxes 50–56 of FIG. 6, indicating which of the five (5) lines of alpha-numeric characters will be selected by the selector 22 if the user should depress a "SEND" key. As indicated to the right of boxes 50–56 in FIG. 6, by the up and down arrow symbols (↑ ↓) in conjunction with the "SEND" key of the selector 22, the user can use the scroller 28, by sequentially pressing an up or down arrow key to select one or the other lines in the display, and then depress the "SEND" key of the selector 22 to place a call to the phone number associated with the selected line on the display.

For the mobile communication unit 10 and method of this example, the steps completed thus far by the user pressing the 6 key a single time results in several possibilities being displayed on the display device 20. For example, if this is the first time that the user has attempted to place a call to any of the numbers in the database, such that $f_c$=0 for all entries, and there are at least four names in the database starting with the letter "M", the display could show the number 6 on the first line and the first four names in the database starting with "M" presented in alphabetical order in the following four lines by virtue of the action of steps 46 and 48. If there have been one or more calls in the past to names starting with the letters "M", "N", and "O", the four most commonly called names starting with the letters "M", "N", or "O" will be displayed on lines 2–5 of the display device. If two or more of these four names starting with "M", "N", or "O" have been called with the same frequency $f_c$, those names may be displayed in alphabetical order.

As depicted by box 50 of FIG. 6, in our example, the database includes at least four names starting with the letter "M". In the example as depicted, the four most commonly called names all start with the letter "M", but the user has called MATS more frequently than MAARTEN. MATS is therefore displayed on the second line, followed by MAARTEN on the third line, with the names MELKER and MICAEL displayed on lines four and five, respectively, thus indicating either that MAARTEN, MELKER, and MICAEL have all been called with equal frequency, or with different frequencies which just happen to coincide with the incidental alphabetical ordering of names on lines 3–5. If the user had desired to call any of the names in the first grouping shown on the display device 20, the scroller 28 and the selector 22 could be used to initiate a call to that party using multiple depressions of the scroll and "SEND" keys, as depicted by the symbols to the right of boxes 50–56 in FIG. 6.

At this point, the user could choose to utilize a scroller 28 to scroll through other groups of names in the organized listing provided by the sorter 18 but not currently displayed on the display device 20 to search for the name of a person the user wished to call, for example, NILS or NICKLAS. Those having skill in the art will recognize that even if the user were to make this choice, this still provides significant reductions in the time and effort required to perform a directory look-up search and locate the phone number of a person the user wished to call, in comparison to prior systems which utilized alphabetical ordering only, if the user has called the desired person more frequently in the past than other persons having names which would precede it on a list of names ordered alphabetically with no consideration for how often those names had been called in the past by the user.

The user in our example wishes to dial a phone number, however, rather than perform a directory search. Accordingly, instead of scrolling through the remainder of the organized listing, our user elects instead to modify the desired character sequence by pushing the 4 (GHI) key to enter the second number of the desired phone number, which coincidentally happens to match the second letter "I" of several of the names in the database. The mobile communication unit 10 now displays names that match the 6,4 keystroke representation of the desired alpha character sequence MI matching the first two letters of several of the names in the database (repeating boxes 30–36). In our example, this results in returning the four most common matches which could be represented by sequentially pressing the 6 and 4 keys. As depicted in box 52, for our example the four names retrieved in order of frequency called most often are MICAEL, MIKAEL/M, NILS, and NICKLAS. Because NILS and NICKLAS would not appear in this particular order alphabetically, it will be noted that these names represent the four most commonly called names in the database which could possibly be represented by the keystroke 6 followed by the keystroke 4. It will also specifically be noted that the user may or may not have called MICAEL more frequently in the past than he has called MIKAEL/M, because MICAEL could appear ahead of MIKAEL/M in the display under either an alphabetical or a frequency called basis.

At this point, if our user wanted to call MIKAEL/M, he could use the scroller 28 to select MIKAEL/M and press the "SEND" key to place a call to MIKAEL on MIKAEL's mobile phone.

For the purpose of illustration, however, our user merely wants to key in and dial a phone number starting with the numerals "645-XXX-XXXX," and accordingly presses the 5 key to enter the third numeral "5" in the desired phone number, which coincidently coincides with the third letter "K" of MIKAEL.

As shown in FIG. 6 at box 54, there appears to be only one name in memory that could possibly match the desired character string represented by sequentially pressing the 6, 4, and 5 keys of the keypad 14, but there appear to be several numbers for MIKAEL. Specifically, three names are displayed with MIKAEL/M sequentially preceding MIKAEL/H and MIKAEL/W. In our example, the user recognizes that in entering numbers into the data records in his database, the designation /M is appended to a name associated with a mobile telephone number, the designation /H is appended to a name designated as a home number, and the characters /W are appended to a name designated as a work number for a name in the database. In this instance, it appears that the user has called MIKAEL in the past more frequently on MIKAEL's mobile number than on either MIKAEL's home number or work number. If our user wanted to do so, he could now use the scroller 28 to scroll down to the MIKAEL/H entry and press the "SEND" key to place a call to MIKAEL at home.

In one option according to the present invention, if a call is made to one of the numbers listed for a name (for example, to the home number of MIKAEL in box 54) and there is no answer, upon terminating that attempted call the display is returned with another number for that name highlighted. For example, the most frequently called number associated with that name other than the number to which the call was just unsuccessfully attempted could be called. In the given example, if the call was attempted to the home number of MIKAEL, then the mobile number of MIKAEL would be highlighted (or if the call had been attempted to the mobile number, then the home number would be highlighted). A second call to that alternate number could then be initiated by simply selecting that highlighted number by pressing the "SEND" key.

In our example, however, our user desires to do a normal phone number entry for a phone number starting with the numerals "645-3XX-XXXX." The fact that the character sequence "645" happens to match the first three alpha characters of the database entries for MIKAEL, is merely a coincidence. Accordingly, our user pushes the 3 key on the keypad to enter the next digit in the phone number that he desires to call.

When the user pushes the 3 key, the database possible match screening circuit 17 of the controller 16 recognizes that there are no entries in the database 12 which could potentially match the character string "6453". As shown in FIGS. 4–6, the mobile communication unit 10 will now switch to normal number entry mode, as shown at box 33*b* of FIG. 4, and display only the 6453 character sequence inputted thus far as the first four digits of a phone number that the user wishes to call, as indicated at boxes 33*c* of FIG. 4, and in box 56 of FIG. 6. The mobile communication unit 10 will then accept and recognize any subsequent keypad entries as the remainder of the desired phone number, and append them to the 6453 character string displayed on the display device 20 as shown in box 56 of FIG. 6. Once our user has entered all of the digits of the phone number he desires to call, he can dial the number by pressing the "SEND" key as illustrated at box 33*e* of FIG. 4.

It should also be appreciated that many mobile communication units include "speed dial" numbers associated with numbers entered by the keypad 14. For example, the number "10" could be the user's home number, number "60" could be a favorite restaurant with other "6*" numbers associated with other favorite restaurants, etc., programmed as desired by the user. In accordance with this, if a user is attempting to call a "speed dial" number associated with "64" in the memory of the unit 10, the display would be as shown in box 52 of FIG. 6 after entering the two digits ("6" and "4"). At that point, the user may highlight the top line of the display in box 52 of FIG. 6 (by pressing the "UP" arrow) and press the "SEND" key, causing the unit 10 to call the "speed dial" number associated in memory with "64".

In some instances, however, "speed dial" numbers may be associated with more than two digits, allowing the storage of more than one hundred speed dial numbers. Further, it should be recognized that some telephone numbers are only three digits (e.g., "411" for directory information). In that case, after the "5" has been entered in the keypad 14 in the FIG. 6 illustration so that the top line displays the three digit "645" number (in box 54), the three digit number may be highlighted by pressing the "UP" arrow. At that point, the user may press the "SEND" key to cause a call to be attempted to the three digit number. If, however, the user is attempting to call the "speed dial" number associated with "645", an alternate mode key may first be pressed (informing the unit 10 that the user wants to dial a "speed dial" number, not the actual entered number), after which the "SEND" key may be pressed to call the "speed dial" number associated with the entered three digit number. The alternate key used to inform the unit 10 that the user is using speed dialing may be virtually any key other than the "SEND" key.

From the foregoing explanations, those having skill in the art will readily recognize that by sorting numbers in the database of a mobile communication unit according to my invention on the basis of the frequency that number has been called in the past, and automatically switching to normal phone number entry mode when the database contains no entries potentially matching the desired number, the process of retrieving a desired telephone number from the database is greatly facilitated over prior approaches which relied totally on alphabetic, or sequential alphabetic, sorting mechanisms and routines.

Although I have described my invention in terms of specific exemplary embodiments, those having skill in the art will recognize that the various aspects, features, and advantages provided by my invention may be utilized in many other arrangements contemplated within the scope of the appended claims.

It is understood, therefore, that the scope of the disclosure and appended claims are not limited to the specific embodiments described and depicted herein.

What is claimed is:

1. A method for operating a mobile communication unit having a database containing data records for one or more telephone numbers with each data record containing an index item stored by a character string, said method comprising:

searching said database for an index item beginning with a desired character string; and automatically switching said mobile communication unit to a normal telephone number entry mode if said database contains no data records having an index item potentially matching said desired character string such that additional characters can be appended to the desired character string without having to manually switch the mode of operation of the mobile communication unit.

2. The method of claim 1 further comprising displaying said desired character string after switching to normal telephone number entry made.

3. The method of claim 1 further comprising retaining said desired character string after switching to normal telephone number entry mode.

4. The method of claim 3 further comprising modifying said desired character string after switching to said normal telephone number entry mode by appending one or more additional characters to said desired character string.

5. The method of claim 1 further comprising recognizing any characters added to said desired character string after switching to normal telephone number entry mode as additional numerical characters and appending said additional numerical characters to said desired character string.

6. The method of claim 1, further comprising:
   selecting said desired character string; and
   selecting between calling said desired character string and calling a speed dial number associated with said desired character string.

7. The method of claim 6, wherein said selecting between calling said desired character string and calling a speed dial number associated with said desired character string comprises pressing a SEND key immediately after said selecting said desired character string to call said desired character string and pressing said SEND key after pressing a selected other key after said selecting said desired character string to call said speed dial number.

8. A method for placing a call using a mobile communication unit operable alternatively in database search mode of telephone number entry or a normal telephone number entry mode and having a display, a keypad having number keys and a scroll key for scrolling said display, a database for storing data records for telephone numbers with each data record containing a frequency with which said mobile unit calls each of said telephone numbers in said database and an index item stored by a character sequence, said method comprising:
   inputting a desired character sequence using said number keys of said keypad;
   searching said database in said database search mode for said index items matching said desired character sequence; and
   automatically switching said mobile communication unit to normal telephone number entry mode if said database has no index items potentially matching said desired character string such that additional characters can be appended to the desired character string without having to manually switch the mode of operation of the mobile communication unit.

9. The method of claim 8 further comprising recognizing any characters input after said step of switching to normal phone number entry mode as additional numerical characters and appending said additional numerical characters to said desired character string.

10. The method of claim 9 wherein said data records further contain a frequency with which each of said telephone numbers in said database is called by said mobile communication unit, and said method further comprises displaying said index items potentially matching said desired character string in a list ordered first by said frequency that said telephone number for that data record is called by said mobile communication unit, and ordered second alphabetically for telephone numbers called with equal frequency by said mobile communication unit, and automatically switching said mobile communication unit to normal telephone number entry mode if said database has no index items potentially matching said desired character string.

11. The method of claim 8 further comprising:
   displaying a portion of said data records including index items matching said desired character sequence on said display;
   modifying said desired character sequence by inputting an additional character with said keypad to be appended to said desired character sequence to create a new desired character sequence;
   searching said database for said index items matching said new desired character sequence;
   displaying a portion of said data records including index items matching said new desired character sequence on said display; and
   automatically switching said mobile communication unit to normal telephone number entry mode if said database has no index items potentially matching said new desired character string.

12. The method of claim 11 further comprising recognizing any characters input after said step of switching to normal phone number entry mode as additional numerical characters and appending said additional numerical characters to said desired character string.

13. The method of claim 11 further comprising repeating said steps of claim 10 by modifying said new character string to create one or more additional new desired character strings and automatically switching said mobile communication unit to said normal telephone entry mode if said database has no index items potentially matching said one or more additional new character strings.

14. The method of claim 13 further comprising recognizing any characters input after said step of switching to normal phone number entry mode as additional numerical characters and appending said additional numerical characters to said desired character string.

15. The method of claim 8, wherein said desired character sequence comprises a number sequence, further comprising:
   selecting said number sequence; and
   selecting between calling said number sequence and calling a speed dial number associated with said number sequence.

16. The method of claim 15, wherein said selecting between calling said number sequence and calling a speed dial number associated with said number sequence comprises pressing a SEND key immediately after said selecting said number sequence to call said number sequence and pressing said SEND key after pressing a selected other key after said selecting said number sequence to call said speed dial number associated with said number sequence.

17. The method of claim 8, further comprising:
   selecting a first displayed data record;
   calling said telephone number of said selected first displayed data record;
   automatically selecting a second displayed data record responsive to said calling said telephone number of said selected first displayed data record being unsuccessful.

18. The method of claim 17, wherein said second displayed data record is the data record of said displayed data records other than said first displayed data record which has been called most frequently.

19. A mobile communication unit comprising:
a database storing data records for one or more telephone numbers with each data record containing a stored character string corresponding to each phone number stored in said database;
a keypad for inputting a desired character string; and
a controller for receiving said desired character string and searching said database in a database search telephone number entry mode for said data records having stored character strings beginning with said desired character string, and automatically switching said mobile communication unit to a normal telephone entry mode if said database does not contain any stored character string potentially beginning with said desired character string such that additional characters can be appended to the desired character string without having to manually switch the mode of operation of the mobile communication unit.

20. The mobile communication unit of claim 19 further comprising a screening circuit in said controller determining if said database includes any data records containing a stored character string beginning with said desired character string and causing said controller to switch said mobile communication unit to said normal phone number entry mode if said database does not contain any data record having a stored character string potentially beginning with said desired character string.

21. The mobile communication unit of claim 19 wherein said controller is configured to retain said desired character string after switching said mobile communication unit to said normal entry mode and for sequentially appending additional inputs from said keypad received from said keypad to said desired character string after switching to said normal telephone number entry mode.

22. The mobile communication unit of claim 19 wherein said controller includes a reset circuit for automatically resetting said mobile communication unit to said database search telephone number entry mode after completion of a call in said normal telephone number entry mode.

23. The mobile communication unit of claim 19 further comprising:
a receiver transmitter for connecting a call to said phone number of said data record selected to be called by said mobile unit; and
an incrementor for incrementing said frequency called in said data record for said telephone number called by said mobile communication unit each time said mobile communication unit calls said telephone number in said database.

24. The mobile communication unit of claim 19, further comprising a display displaying data records having stored character strings beginning with said desired character string only when in said database search telephone number entry mode.

25. The mobile communication unit of claim 19, wherein:
said database further stores speed dial numbers each associated with a discrete numeric string;
said keypad is for
inputting said desired character string as a numeric string,
selecting an input numeric string, and
selecting between calling said numeric string and calling said speed dial number associated with said selected numeric string.

26. The mobile communication unit of claim 25, said keypad further comprising a SEND key and a mode key, and
said controller causing said mobile communication unit to call said numeric string when said SEND key is pressed after selecting said input numeric string, and
call said speed dial number associated with said number sequence when said SEND key is press after said mode key is pressed after selecting said input numeric string.

27. The mobile communication unit of claim 19, wherein:
said keypad is for selecting one of said data records having stored character strings beginning with said desired character string; and
said controller selects another of said data records having stored character strings beginning with said desired character strings responsive an unsuccessful attempt to call said telephone number of said selected one data record.

28. The mobile communication unit of claim 27, wherein said another of said data records is the data record of said data records having stored character strings beginning with said desired character strings, other than said selected one data record, which has been called most frequently by said mobile communication unit.

29. A mobile communication unit comprising:
a database storing data records for one or more telephone numbers with each data record containing a stored character string corresponding to phone numbers stored in said database and a frequency called value representing a frequency with which said mobile communication unit places a call to each said phone number stored in said database;
a keypad for inputting a desired character string;
a controller for receiving said desired character string and searching said database in a database search telephone number entry mode for said data records having stored character strings beginning with said desired character string, and providing a listing of data records identified by said searching of said database together with frequency called for each of said data records;
a screening circuit in said controller automatically switching said mobile communication unit to a normal telephone number entry mode if said database does not contain any data records beginning with said desired character string such that additional characters can be appended to the desired character string without having to manually switch the mode of operation of the mobile communication unit;
a sorter for sorting said data records provided by said controller;
a display device for displaying a grouping of said data records in order as sorted by said sorter;
a selector for selecting a data record from said displayed grouping to be called by said mobile communication unit;
an incrementor for incrementing said frequency called in said data record for said telephone number called by said mobile communication unit each time said mobile communication unit calls said telephone number in said database, and
a reset circuit for automatically resetting said mobile communication unit to said database search telephone number entry mode after completion of a call in said normal telephone number entry mode.

* * * * *

UNITED STATES PATENT AND TRADEMARK OFFICE
CERTIFICATE OF CORRECTION

PATENT NO. : 6,947,770 B2
DATED : September 20, 2005
INVENTOR(S) : Nils R. Rydbeck It is certified that error appears in the above-identified patent and that said Letters Patent is hereby corrected as shown below:

Column 12,
Line 36, delete "10" and insert -- 11 --.

Signed and Sealed this

Twenty-ninth Day of November, 2005

JON W. DUDAS
*Director of the United States Patent and Trademark Office*